(12) United States Patent
Tudorache et al.

(10) Patent No.: US 12,259,132 B2
(45) Date of Patent: Mar. 25, 2025

(54) METHOD FOR IMPROVING THE HOMOGENIZATION OF THE TEMPERATURES IN A STEAM METHANE REFORMER BY ADJUSTING THE POWER DISTRIBUTION

(71) Applicant: L'Air Liquide Société Anonyme pour l'Etude et l'Exploitation des Procédés Georges Claude, Paris (FR)

(72) Inventors: Diana Tudorache, Bures sur Yvette (FR); Guillaume Lodier, Senlisse (FR); Fouad Ammouri, Massy (FR); Julien Lagarde, Paris (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 393 days.

(21) Appl. No.: 17/772,613

(22) PCT Filed: Oct. 21, 2020

(86) PCT No.: PCT/EP2020/079546
§ 371 (c)(1),
(2) Date: Apr. 28, 2022

(87) PCT Pub. No.: WO2021/083752
PCT Pub. Date: May 6, 2021

(65) Prior Publication Data
US 2023/0015500 A1      Jan. 19, 2023

(30) Foreign Application Priority Data

Oct. 28, 2019 (EP) .................................... 19205660

(51) Int. Cl.
F23N 1/02   (2006.01)
C01B 3/38   (2006.01)
F23C 13/00  (2006.01)

(52) U.S. Cl.
CPC .............. *F23N 1/022* (2013.01); *C01B 3/384* (2013.01); *F23C 13/00* (2013.01);
(Continued)

(58) Field of Classification Search
CPC .. F23N 1/022; F23N 2237/12; F23N 2239/04; C01B 3/384; C01B 2203/0233;
(Continued)

(56) References Cited

U.S. PATENT DOCUMENTS

2011/0113993 A1* 5/2011 Esmaili .................. B01J 12/007
110/190

FOREIGN PATENT DOCUMENTS

| EP | 2 325 562 | 5/2011 |
| EP | 3 279 561 | 2/2018 |
| FR | 2 911 600 | 7/2008 |

OTHER PUBLICATIONS

International Search Report and Written Opinion for corresponding PCT/EP2020/079546, Jan. 13, 2020.

\* cited by examiner

*Primary Examiner* — Vivek K Shirsat
(74) *Attorney, Agent, or Firm* — Elwood L. Haynes

(57) ABSTRACT

A method of improving an endothermic process in a furnace utilizing steps a) calibrating the simplified physical model of step c3) by measuring one or more tube temperature for at least a tube impacted by the throttling of a burner in standard and in throttled state, b) acquiring information on a tube temperature for the tubes present in the furnace with all the burners present in the furnace under standard non-throttled conditions, c) getting a map of burners to throttle including
(Continued)

c1) choosing at least one parameter representative of the performances of the furnace with a target of improvement, c2) choosing at least one or more power ratio for the burner throttling, c3) utilizing the information of step b) and a simplified physical model of the impact of throttling a burner on the tube temperature, c4) getting a map of burners to throttle, step d) throttling the burners.

8 Claims, 8 Drawing Sheets

(52) U.S. Cl.
CPC ............... *C01B 2203/0233* (2013.01); *C01B 2203/1241* (2013.01); *C01B 2203/1619* (2013.01); *F23C 2900/03002* (2013.01); *F23N 2223/44* (2020.01); *F23N 2225/16* (2020.01); *F23N 2237/12* (2020.01); *F23N 2239/04* (2020.01)

(58) Field of Classification Search
CPC ............ C01B 2203/1619; F23C 13/00; F23C 2900/03002
USPC .......................................... 431/12
See application file for complete search history.

METHOD FOR IMPROVING THE HOMOGENIZATION OF THE TEMPERATURES IN A STEAM METHANE REFORMER BY ADJUSTING THE POWER DISTRIBUTION

CROSS REFERENCE TO RELATED APPLICATIONS

This application is a 371 of International Application No. PCT/EP2020/079546, filed Oct. 21, 2020, which claims priority to European Patent Application No. 19205660.4, filed Oct. 28, 2019, the entire contents of which are incorporated herein by reference.

BACKGROUND

The present invention relates to a method of improving an endothermic process that takes place in a furnace containing tubes being filled with a catalyst for the chemical conversion of a gaseous feed and positioned vertically in rows inside the furnace, burners being mounted in rows with rows of inner burners placed between two rows of tubes and rows of outer burners placed between a row of tubes and a side wall parallel to the rows of tubes, with heat being transferred from the burners to the tubes and with flow rates associated, where the method improves the homogenization of the temperatures of the tubes by throttling part of the burners.

It allows to improve the operation of reforming furnaces, in terms of security and debottlenecking as well, and is particularly suitable for top-fired or bottom-fired furnaces for steam methane reforming (SMR) and other endothermic reactions like hydrocarbon feedstock cracking in externally fired reactors.

The SMR process is mainly based on the reforming reaction of light hydrocarbons such as methane that yields to a mixture of hydrogen ($H_2$) and carbon monoxide (CO) in the presence of steam. The reaction is endothermic and slow and requires additional heat input, as well as a catalyst to occur. Usually, SMR reactor performances are limited by the heat transfer and not by the kinetics of the reactions.

In industrial practice, the SMR reactor usually comprises tubular reformers—also known as tubes—placed in a furnace, said tubes being filled with catalyst—usually in the form of pellets—and fed with the process gas mixture of methane and steam.

Several well-proven configurations are available for furnace design: top fired (also known as down fired), bottom fired (also known as up fired), side fired, and terrace wall.

Top-fired technology is one of the most referenced designs and is proposed by several technology providers.

Seeking for simplicity, most of the explanations that follow are made with regard to a top fired furnace, however most of the figures and explanations applies as well to bottom fired furnaces, Explanations are made with regard to a steam methane reforming process but apply as well to other endothermic reactions like hydrocarbons feedstock cracking in externally fired reformers.

Top-fired furnaces are typically made of a refractory lined firebox containing several rows of catalyst containing tubes. For each row of tubes, the syngas is collected from each tube in a common pipe outside the firebox known as syngas collector. The syngas collected from all rows join in the cross header and is then transferred to the process gas cooler.

The necessary heat for the endothermic reaction to occur is provided by roof burners placed in rows between the tubes, and also by rows of additional roof burners at the furnace side, along the side walls of the furnace parallel to the tubes rows. The combustion products out of the burners are usually blown vertically downwards, so that the tube rows face the flames in their upper part. A flue gases exhaust collector is usually provided at the furnace floor level. The outer rows of burners i.e. along the side walls are only heating one row of tubes on one side and the refractory side wall on the other side. Each of the inner rows of burners situated in the middle of the firebox are heating two rows of tubes on both sides of the burners row. Therefore, the outer burners need to provide less power than the inner burners.

The bottom fired technology is less common in modern plants. According to the bottom fired technology, the burners are also arranged in rows but they are installed on the floor of the firing area between the tube rows and fire vertically upwards.

The main objective of the furnace (also called firebox) design is to maximize the heat transferred from the burners to the tubes—from the burner flames and also from the walls and the hot flue gas—while respecting a tube maximal operating temperature constraint. The tube maximum operating temperature or MOT (also known as maximal operating constraint) is a function of several factors, particularly of the tube mechanical load (mainly feed gas pressure), of the mechanical properties of the alloys used for the tubes and of the desired lifetime of the tubes exposed to creep and thermal aging.

Any intensification of the heat transferred to the tubes has a direct positive impact, either by increasing the productivity or by improving the compactness of the firebox which is valuable in terms of capital expenditures. However, intensification of the heat transferred usually implies higher Tube Skin Temperature (TST) levels that either reduce tube lifetime or require more resistant alloys—which are much more expensive.

Lack of homogeneity in the heat duty distribution in the furnace will lead some of the tubes to be hotter than the other, that's why temperature profiles of tubes are critical elements for the furnace design and during operation. When looking for a good compromise between performance and durability—and a good compromise is actually essential—, tube skin temperature TST profiles (known also as tube wall temperature TWT or simply tube temperature) provide decisive information.

During operations, the performances of the furnace are therefore limited by the temperature of the hottest tube i.e. maximum tube temperature or MTT which should not be hotter than the MOT. In the meantime, the performance of the process (the productivity or efficiency of conversion, or a combination of) depends on the average tubes heat flux and temperature. Therefore, the smaller is the difference between the hottest tube temperature and the coldest tube temperature, the better is the furnace performance.

In common designs, the lower ends of the tubes belonging to a row are connected to a syngas collector. For each syngas collector, an associated temperature sensor measures the temperature of the syngas collected. This temperature known as "syngas collector temperature" is representative of the average temperature of the connected tubes. Other estimation of the performance is then given by the difference between the temperature of the hottest syngas collector and the temperature of the coldest syngas collector, known as "syngas collector temperature spread".

In steam methane reforming, to allow for the reforming reactions to occur, the tubes contain a catalyst media. In a top fired furnace, the feed is supplied to the tubes at their top end, the synthesis gas produced, containing hydrogen and carbon monoxide as major components along with residuals, is withdrawn at the bottom part of the tubes. The combustion chamber of the furnace being usually of rectangular shape, burners are arranged in rows along the length of the furnace, between the tubes rows for the inner burners rows, and between the external tubes rows and the side walls for the outer burners rows to provide heat necessary for the process gas conversion. The flue gases are extracted through exhaust tunnels.

An outcome inherent to the firebox design constraints is an inhomogeneous transfer of the available heat among the reformer tubes. Some of the reasons leading to this inhomogeneous transfer are listed here after:
the way tubes and burners are distributed in the rows inside the firebox;
maldistribution of air and fuel flows emerging from distinct manifolds into the burner nozzles;
different jet momentum fluxes between burners of the outer rows and of the inner rows;
unbalanced feed gas distribution;
disposition of the opening of the tunnels for the flue gas outlet;
the geometrical effect of the flue gas duct convergent.

Further discrepancies between tube temperatures can arise onsite:
during firebox built-up, like a non-uniform catalyst filling or a burner wrong installation;
also during plant exploitation like a burner malfunctioning issue e.g. an operating condition creating coke on the burner gas tips or installations or catalyst aging.

All these drawbacks inherent to the firebox design or that may appear during the built-up of the firebox or that are arising as the unit is operated, lead to the difference between the hottest and the coldest tube temperatures, known as "tube temperature spread".

It is mandatory to reduce the tube temperature spread to ensure the best tradeoff between efficiency and tube lifetime in a SMR furnace.

It is also mandatory to correct and/or compensate those discrepancies that are not anticipated. Finding mitigation strategies is therefore of great interest for improving the operation of SMR plants.

When it is not possible to prevent or foresee differences in the behavior of the tubes, a solution is to apply a curative method, applicable on-site which mitigates the differences in temperature among the reforming tubes.

A solution to reduce the temperature spread is to adapt the power of the burners individually to homogenize the heat transfer to the reforming; this can be obtained by individual burner throttling.

The reduction of the temperature spread thus obtained will lead to improvement of the plant performance; another advantage is that the solution can be applied during normal operations without having to wait for maintenance periods.

Burners are fed with primary and secondary fuel streams and oxidizer stream. Change of the burner power can be obtained by acting one or several streams:
the secondary fuel stream—commonly off-gas—which usually has the highest contribution to the burner power;
the primary fuel stream—commonly natural gas—, this stream has less flexibility in terms of flow rate variations as a minimum quantity is required to assure the burner well-functioning in case of fluctuations of the composition of the main contributor;
the oxidizer stream; it is also theoretically possible, but this flow having the highest flow rate, it will be necessary to take care of the interactions between burners with different momentum flux ratios.

The flow rate reduction of at least one of fuels (primary or secondary) or oxidizer streams can be obtained by throttling their related valves, it can also be obtained by installing flow rate restriction orifices.

A burner which power has been reduced by decreasing the flow rate of one or several streams is referred to as a "throttled burner".

Mitigating the spread of the tube temperatures, and therefore mitigation strategies are of great interest for improving the operation of SMR plants.

In SMR plants, it is now standard practice to equip the burners with valves and therefore the throttling of burners does not require plant shutdown to be applied.

Decreasing the spread of the tube temperatures by throttling burners is known per se, however, the way to proceed to a judicious choice of a suitable set of burners can be largely improved.

It is known to select a set of burners to be throttled thanks to empirical trial-and-error methodology. This method is a practice of the man skilled in the art for existing plants, however it is time consuming and the results may not be satisfactory.

Another solution is proposed in EP 2325562 that discloses a method of operating a furnace where it is desired to conform the temperature of the tubes to selected target temperature criterion; the method provides a systematic and quantitative approach to determine how to adjust burner flow rates to result in desired tube skin temperatures, for example to minimize the temperatures deviation between tube wall temperatures at a predetermined elevation in the furnace. Burner flow rates are adjusted in accordance with calculated target flow rates, which were calculated using the estimate of a mathematical function and the temperature information. The method requires acquiring information on the temperature of the process tubes by capturing images comprising pixel data and processing the pixel data to obtain the temperature information. The approach also includes providing an estimating of the mathematical function characterizing a relationship between burner flow rate changes and temperature changes of the process tubes. The drawback of the method is its complexity and the time required for estimating the mathematical function parameters needed from iterative TST measurements associated with acquiring and processing of images which include temperature information. The method therefore requires material, manpower on-site and time necessary to operate IR camera to evaluate the relation between the burner throttling and the TST.

As stated above, finding the best burners to throttle may be tricky and time consuming in practice, especially for large furnaces with numerous burners and tubes, and this is a real weakness of the known solutions.

It remains therefore a need for an improved throttling method that allows to identify a suitable set of burners to be throttled and to throttle them so as to mitigate the spread of the tubes temperatures. More precisely, there is a need for a method allowing to acquire a suitable set of burners to be throttled thanks to an efficient, quick and easy to implement methodology, bringing therefore an advantage determining with regard to the already known solutions.

SUMMARY

The invention aims at proposing a method for improving and controlling in operation the skin temperatures of the tubes present in a furnace thanks to an efficient and quick determination of a suitable set of burners—also referred to as map of burners—that should have advantageously their power reduced in order to decrease the spread of the temperature of the tubes in the furnace. Thanks to the solution of the invention, a suitable map of burners to be throttled so as to reach for at least one chosen parameter an intended target can be achieved much more rapidly than in the known solutions. Parameters are chosen with a view to improve the performance of the process. Examples of parameters chosen and the related targets are listed hereafter:

parameter being maximum TST, the target being to reduce the maximum TST;

parameter being TST spread, the target being to reduce the TST spread;

parameter being syngas collector temperature spread, the target being as well to reduce the SCT spread.

Thus, the method limits the labor requirements on site and the risk associated with it. Thanks to the invention, on-site manpower will be required only to perform a single set of TST measurements and eventually to throttle valves manually if this tasks cannot be performed remotely from the control room. For the first implementation of the methodology in a plant, a calibration step is required, which implies to acquire information on real tube temperature for at least a tube, preferably the closest to a burner in non-throttled and throttled conditions. The information can be obtained by using the means present on-site for tube temperature measurements, commonly by means of a thermocouple and/or a pyrometer and/or an Infrared camera, but as well by any other suitable means.

With the solutions of the prior art to get a map of burner to throttle presented above, the map takes too much time to be obtained and thus it is difficult to use frequently on-site such solutions in order for the operators to make decisions in day-to-day work.

By applying the solution of the present invention, this drawback is avoided. Thanks to the invention, the determination of a map of burners to be throttled at one or more chosen power ratio(s) T can be established in few minutes. The power ratio r of a given burner is a representation of the power delivered by this burner.

In the context of the invention, the power ratio $\tau$ is:

$$\tau = \frac{P \text{ non-throttled} + \Delta P}{P \text{ non-throttled}}$$

where P non-throttled is the power of the burner in normal operational mode (i.e. nominal mode) and $\Delta P$ is the power variation induced by the throttling:

either $\Delta P<0$: case when the burner power has decreased due to the throttling of the burner;

or $\Delta P>0$: case when the burner power of a non-throttled burner increases due to redistribution of power among the non-throttled burners in the furnace.

The power ratio $\tau$ of a given burner can also be expressed as a percentage, and in that case:

$\tau\%=100\%$ means that the burner and all burners are in standard (i.e. nominal) state and $\Delta P=0$ $\tau\%=0\%$ means that the burner is closed; $\Delta P=P$ non-throttled $\tau\%>100\%$ means that the burner is in standard state, but with redistributed power—it takes into account that other burners in the furnace are throttled. When at least one burner is throttled, the power in excess is consequently redistributed between the non-throttled burners so as to keep the sum of all burner power unchanged.

$\tau\%<100\%$ means that the burner has been throttled so as to decrease the power delivered by this burner The solution of the invention relies upon:
1) A calibration step required for the first implementation of the methodology in a plant; This step implies acquiring information on the real tube temperature of a single tube closest to a burner before and after throttling.
2) Acquisition of initial data by acquiring information on a real tube temperature for the tubes present in the furnace under non-throttled conditions.
3) Automatic acquisition of a map of burners to throttle by applying the following methodology:
   i) choosing parameters and targets representative of the plant performance—usually maximum TST and decrease of, and/or TST spread and decrease of, and/or SCT spread and decrease of, and/or other suitable parameters with associated target,
   ii) choosing one or more power ratio to be applied to a plurality of burners in the furnace,
   iii) then calculating automatically the variation of the TST in response to the throttling of different burners in the furnace to automatically get an optimal map of burners to be throttled.
4) Finally, individual throttling of the burners according to said map of burners to be throttled.

The inventors have found that it was possible to determine quickly a suitable map of burners to throttle, thanks to a rapid estimation of the TST of the tubes—point 3 iii) here above—in response to the throttling of the different burners by applying some rules that simplify the calculation of the impact of the throttling of one or more burner(s) on the tubes present in their vicinity.

Getting a map of burners to throttle is crucial. The solution according to the invention as hereafter disclosed, allows to drastically accelerate the achievement of said map by proposing a simplified physical model of the burner throttling impact on the tube skin temperature TST.

In order to be able to put forward some rules that govern the impact of the throttling of a burner on tubes skin temperature variations, the inventors, first and foremost, have established the impact of throttling the burners—on the tube skin temperature—using numerical simulations. The simulations were made using an in-house SMR3D solver intended for calculation of the heat transfer between the combustion chamber and the tubes, More precisely, 3-D Computational Fluid Dynamic (CFD) is used for the combustion chamber and a 1-D model is used to take into account the kinetics of the reforming reactions, known suitable solvers or in-house solvers may be used. Simulations are made in a representative domain of the firebox (part of the firebox representative of the whole) to define a simplified physical model.

The analysis of the tube skin temperatures in response to various burners throttling led the inventors to define the following rules of behavior (point 1 to point 3 hereafter and FIG. 4 to FIG. 6) used to build the simplified physical model of the invention:

Point 1. FIG. 4 illustrates the impact of throttling a single burner on the TST of the surrounding tubes, it shows also that throttling an outer burner (FIG. 4a) behaves differently than throttling an inner burner (FIG. 4b):

for outer burners and inner burners as well, throttling a burner impacts significantly the two closest rows of tubes, said rows are hereafter referred to as "impacted rows", the impact on tubes of farther rows being negligible. For an outer burner the two impacted rows are on the same side of the throttled burner, whereas for an inner burner, the two impacted rows are one on each side of the throttled burner;

an outer burner throttling has a high impact on the closest row of tubes and a lower impact on the second impacted row whereas an inner burner throttling distributes the impact on the closest row of tubes on each side;

within each impacted row, a throttled burner has the highest impact on the closest tubes, —said tubes are hereafter referred to as "impacted tubes"—, with the impact decreasing rapidly while moving off from the throttled burner; the number of tubes affected by the throttling of a burner is estimated at 4×Ntubes/Nburners (obviously rounded to a whole number) where Ntubes is the number of tubes in the row and Nburners is the number of burners in the row.

Point 2. As illustrated by FIG. 5a and FIG. 5b, it has also advantageously been found, thanks to the numerical simulations, that the throttled burners have cumulative effects on the TST of the impacted tubes. FIG. 5a shows the result of a single simulation with two burners throttled, FIG. 5b shows the result of the addition of two simulations with individual throttling.

Point 3. Also, as illustrated by FIG. 6, TST variation is proportional to the power of the throttled burner. Thanks to simulations, it has been possible to establish that the tube skin temperature variation (TST) and the power ratio are roughly proportional.

These rules of behavior regarding the evolution of the TST of the tubes in the SMR furnace in response to burner throttling have contributed to the establishment of a simplified physical model to predict quite instantly the impact of burners throttling on tubes skin temperature.

Then, to finalize the invention, the model was combined with an optimization algorithm to automatically get the map of burners to be throttled. In house optimization algorithm may be used or algorithms for optimization known in the art, such as black box optimization algorithms.

Based on the above, a methodology was established that aimed at improving the distribution of the heat transferred to the tubes, according to the parameter(s) and target chosen, e.g. by reducing the maximum tube temperature or by mitigating the tube or collector temperature spread.

It is therefore an object of the invention to propose a method of improving an endothermic process that takes place in a furnace containing tubes being filled with a catalyst for the chemical conversion of a gaseous feed and positioned vertically in rows inside the furnace, burners being mounted in rows with rows of inner burners placed between two rows of tubes and rows of outer burners placed between a row of tubes and a side wall parallel to the rows of tubes, with heat being transferred from the burners to the tubes and with flow rates associated, where the method improves the homogenization of the temperatures of the tubes by throttling part of the burners, characterized in that the method comprises the steps of:

step a) optionally acquiring information on a real tube temperature for at least a tube closest to a burner in standard and in throttled state, step b) acquiring information on a real tube temperature for the tubes present in the furnace with all the burners present in the furnace under standard non-throttled conditions, step c) getting a map of burners to throttle including:
c1) choosing at least one parameter representative of the performances of the furnace with a target of improvement,
c2) choosing at least one or more power ratio for the burner throttling,
c3) utilizing the information of step b) and a simplified physical model of the impact of throttling a burner on the tube skin temperature for the tubes in the furnace to individually know the impact of the throttling of a burner on the chosen target of step c1), and individually identifying burners to throttle,
c4) getting a map of burners of the furnace where the burners to throttle are individually identified, step d) throttling the burners according to the map got in step c4).

The method of the invention can present one or more of the following variants, alone or in combination:

According to a preferred variant, said simplified physical mod& of the impact of burner throttling on the tube skin temperature is based on the following rules 1) to 3) of behavior:

1) throttling a burner impacts significantly the two closest rows of tubes, said two closest rows of tubes being on the same side for an outer burner and one on each side of the burner for an inner burner; throttling an outer burner has a higher impact on the closest row of tube than on the second row whereas an inner burner throttling distributes the impact on the closest rows of tubes on both sides; within any of the impacted rows, the throttling of a burner has the highest impact on the closest tubes, the impact on the tubes decreasing rapidly while moving off from the throttled burner, the number of tubes impacted by the throttling of a burner is estimated at 4×Ntubes/Nburners, for the impacted tubes the tube skin temperature variation is proportional to the distance from the throttled burner with Ntubes=number of tubes in the row, and Nburners=number of burners in the row;

2) the impacts of throttled burners on the tube temperature cumulate;

3) the tube temperatures variations are proportional to the power ratio $\tau$, with $\tau$ being:

$$\tau = \frac{P \text{ non-throttled} + \Delta P}{P \text{ non-throttled}}$$

where P non-throttled is the power of the burner in standard operational mode and $\Delta P$ is the power variation induced by the throttling with $\Delta P<0$ when the burner power has decreased due to the throttling of the burner and $\Delta P>0$ when the burner power increases due to redistribution of the power among the non-throttled burners in the furnace.

Advantageously, the one or more parameters of step c1) is chosen among the following: Maximum Tube Skin Temperature, Tube Skin Temperature Spread, Syngas Collector Temperature Spread with the target of improvement being the reduction of the parameter value.

Preferably, in step c3) the simplified physical model is combined with an optimization algorithm which is either an in house optimization algorithm or algorithms for optimization known in the art, such as black box optimization algorithms.

The throttling of the burners may be obtained by partially closing at least a valve installed on at least one of the fuel streams or oxidizer stream, preferably on the fuel streams, and more preferably on the secondary fuel stream.

Advantageously, the power ratio τ% of a throttled burner is between 90% and 50%, preferably between 80% and 60%.

Preferably, the information on a real tube temperature of step b) is the tube skin temperature, being preferably obtained by means of a thermocouple or a pyrometer or an Infrared camera, or deduced from the syngas collector temperature being preferably obtained by means of a thermocouple.

The method may comprise the calibration of step a) where real tube temperature measurements are performed for one or more tubes impacted by a throttled burner, at least for a tube in front of said burner in non-throttled and in throttled conditions, with the burner being preferably an outer burner.

The method of the invention allows to debottleneck a process/installation for producing hydrogen—or another gas or a mixture of gas—from a synthesis gas obtained by steam gas reforming, by homogenizing the temperatures of the tubes by adjusting the power distribution.

The maximum TST being reduced below MOT, the load of the unit can be increased until the maximum tube temperature reaches the MOT.

It is another object of the invention to propose a furnace containing tubes being filled with a catalyst for the chemical conversion of a gaseous feed and being positioned vertically in rows inside the furnace, burners being mounted in rows with rows of inner burners placed between two rows of tubes and rows of outer burners placed between a row of tubes and a side wall parallel to the rows of tubes, with heat being transferred from the burners to the tubes and with flow rates associated characterized in that part of the burners are individually throttled according to a map got by any of the methods described hereabove.

The present invention and its advantages will be described in more detail on the basis of the drawings and in the examples that follow.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein:

FIG. 7b shows experimental TST profiles: for the standard operational mode of the burners (i.e. all the burners are in the standard non throttled state) and for optimized burner throttling according to the map of the FIG. 8a;

FIG. 8b shows experimental TST profiles for the standard operational mode of the burners and for optimized burner throttling according to the map presented on FIG. 9a;

FIG. 9 shows the evolution of the syngas collector temperature spread for standard configuration and the throttling maps implemented on-site as per the 1st example of FIG. 8a and the 2nd example of FIG. 9a.

DETAILED DESCRIPTION OF PREFERRED EMBODIMENTS

The following detailed description of the figures and of the examples will help understanding the invention.

Figure 1:
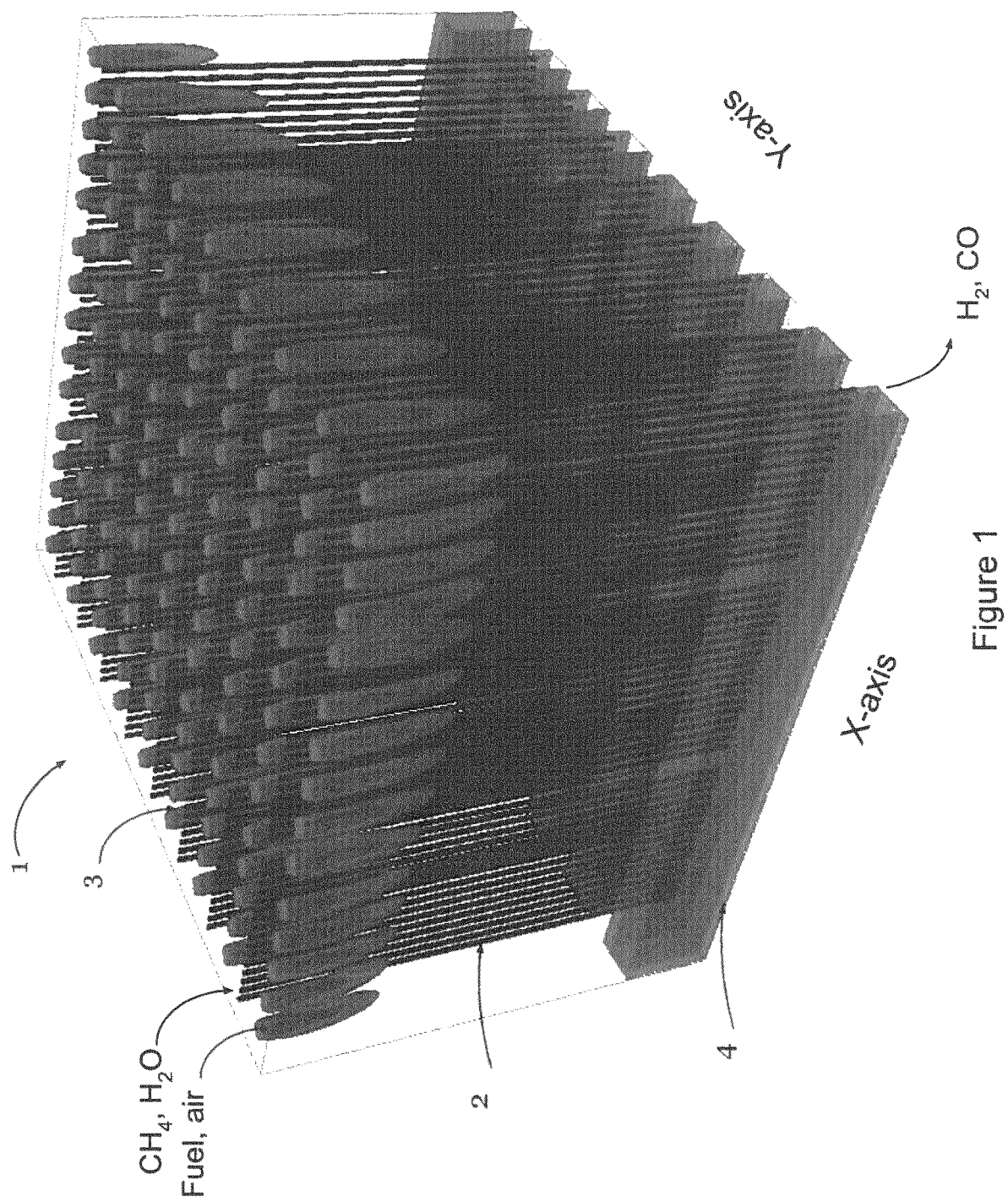
FIG. 1 shows a typical arrangement of tubes and burners using a 3D representation of a top-fired furnace used for syngas synthesis.

FIG. 1 is a 3D perspective view of a furnace; more exactly, it shows a typical arrangement of a top-fired furnace 1 used to produce a synthesis gas. Tubes 2 containing reforming catalyst are arranged in rows within the furnace 1. A feed gas, gaseous mixture of methane and steam is supplied to the inlet of the tubular reformers 2 on the top part of the firebox and, as it flows through the catalytic bed towards the bottom of the tubes 2, the process gas is transformed and it exits as synthesis gas: a mixture of mainly hydrogen and carbon monoxide (also known as syngas). Burners 3 are placed between the rows of tubes, each row of tubes being therefore lined by two rows of burners; the direction of the rows of tubes and of the rows of burners as well is the direction of X-axis. The flue gases, produced by the combustion in the burners 3 of a mixture of fuel and air, are withdrawn through exhaust tunnels 4 installed at the bottom of the furnace, parallel to the rows. The direction perpendicular to the rows is identified as Y-axis.

Figure 2:
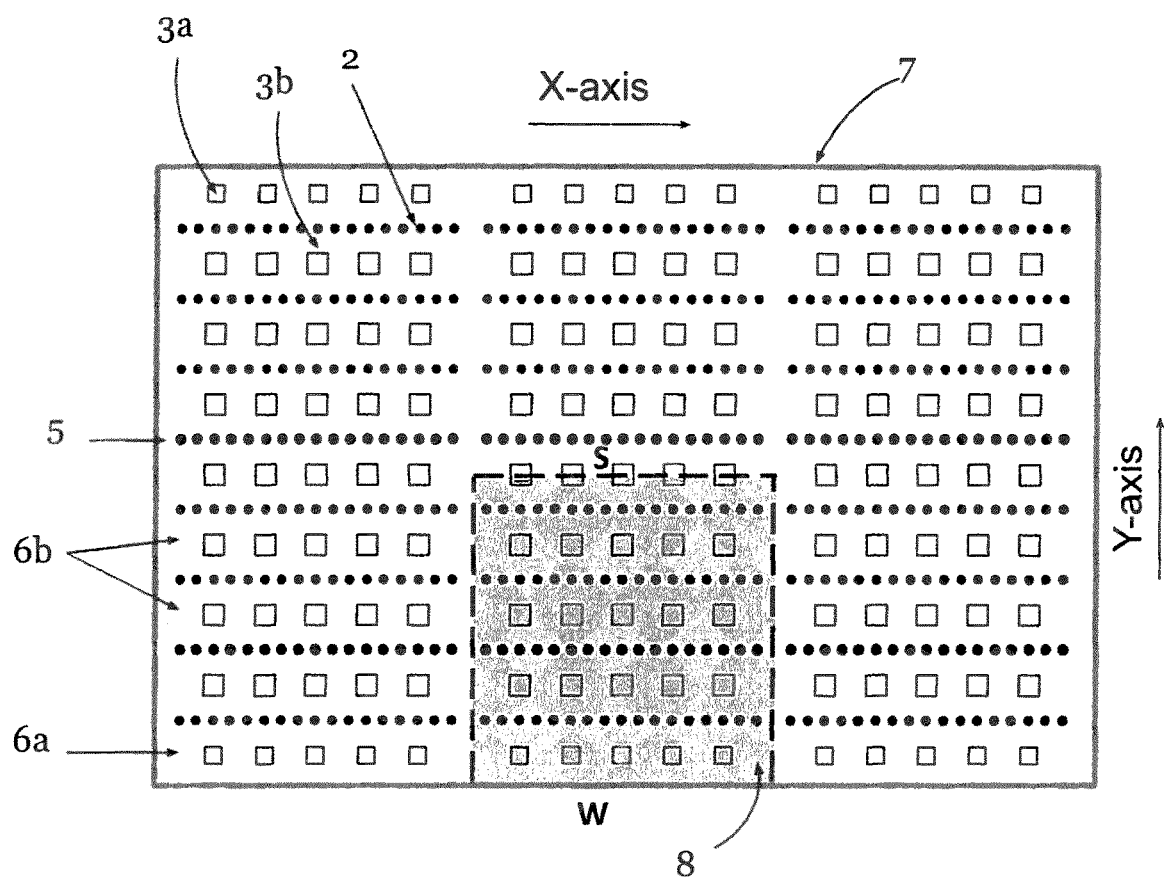
FIG. 2 shows a top view of the top-fired furnace highlighting tubes and burners organization and also a representative domain.

FIG. 2 presents a top view of the top-fired furnace 1 containing 8 rows 5 of tubes with 50 tubes 2 and 9 rows 6a, 6b of burners, each row containing 15 burners 3a, respectively 3b, parallel to the rows of tubes. The burners are organized in 2 outer rows 6a and 7 inner rows 6b; each row 6a of burners 3a (known as outer burners) extends between one of the two side walls 7 and a row of tubes and each inner row 6b of burners 3b (known as inner burners) is surrounded on each side by a row of tubes. This organization makes the outer burners 3a, which heat up the tubes of one row, to standardly run at lower power than the inner burners which heat up the tubes of two rows. The figure highlights, in grey, a representative domain 8—within the meaning of the invention—composed of a subset of 4 partial rows of tubes with 17 tubes, heated by 3 partial rows of inner burners and 1 partial row of half inner burners (burners cut in their middle along the symmetry plane S parallel to X-axis and parallel to the plane W representative to the side wall). Along the direction of Y-axis, the domain 8 is as well limited by 2 symmetry planes that are perpendicular to the symmetry plan S. This domain 8 is used for the illustration of the invention, for the simulations and also for the figures in relation with the simulations.

Figure 3A:
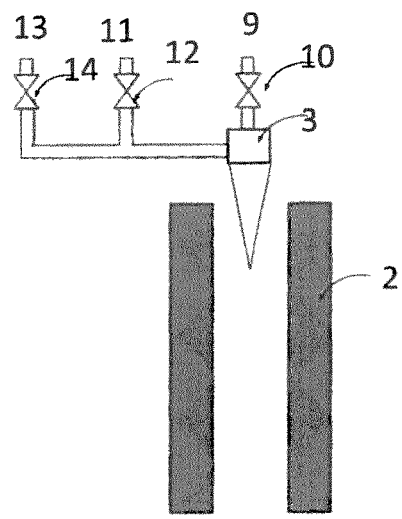
FIG. 3a shows the main streams entering a burner in a standard operational mode.

FIG. 3a presents the main streams entering a burner 3, each stream being conveyed by a pipe equipped with a valve; that is to say: the oxidizer stream 9 flows through the valve 10, the natural gas (primary fuel) stream 11 flows through the valve 12, and the off gas (secondary fuel) stream 13 flows through the valve 14. The furnace is operating in standard mode, the valves are fully opened, the streams flow without restriction.

As stated above, the invention aims at reducing the temperature of the hottest tubes; to achieve this goal, the invention aims at reducing the power of some specifically selected burners by reducing the flow rate of preferably one or more fuel streams. Thus the amount of heat transferred to the impacted tubes is reduced, leading to the decrease of their temperatures.

Figure 3B:
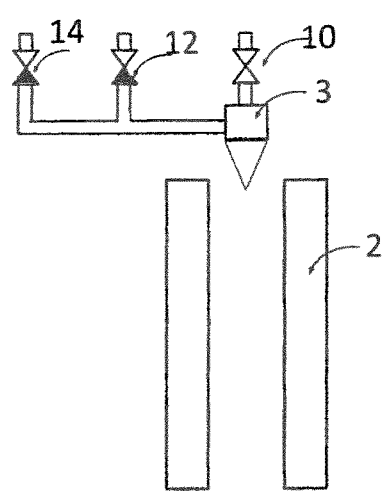
FIG. 3b shows the main streams entering the burner of FIG. 3a in an operational mode with a burner throttled by partially closing the primary and secondary fuel valve.

FIG. 3b presents the streams 9, 11, 13 entering the burner operating according to the invention. In a preferred mode of the invention, the power issued from the off gas stream 13—which in standard conditions is the main fuel contributor—, and from the natural gas stream 11 is reduced by throttling the valve 14 and respectively 12. This reduction of the burner power provided by throttling the fuel valves will induce in response a decrease of the TST of the nearby tubes according to the above mentioned rules of behavior 1 to 3. Note that a reduction in burner power could be also achieved by throttling only one of the fuel valves.

Figures 4A, 4B:
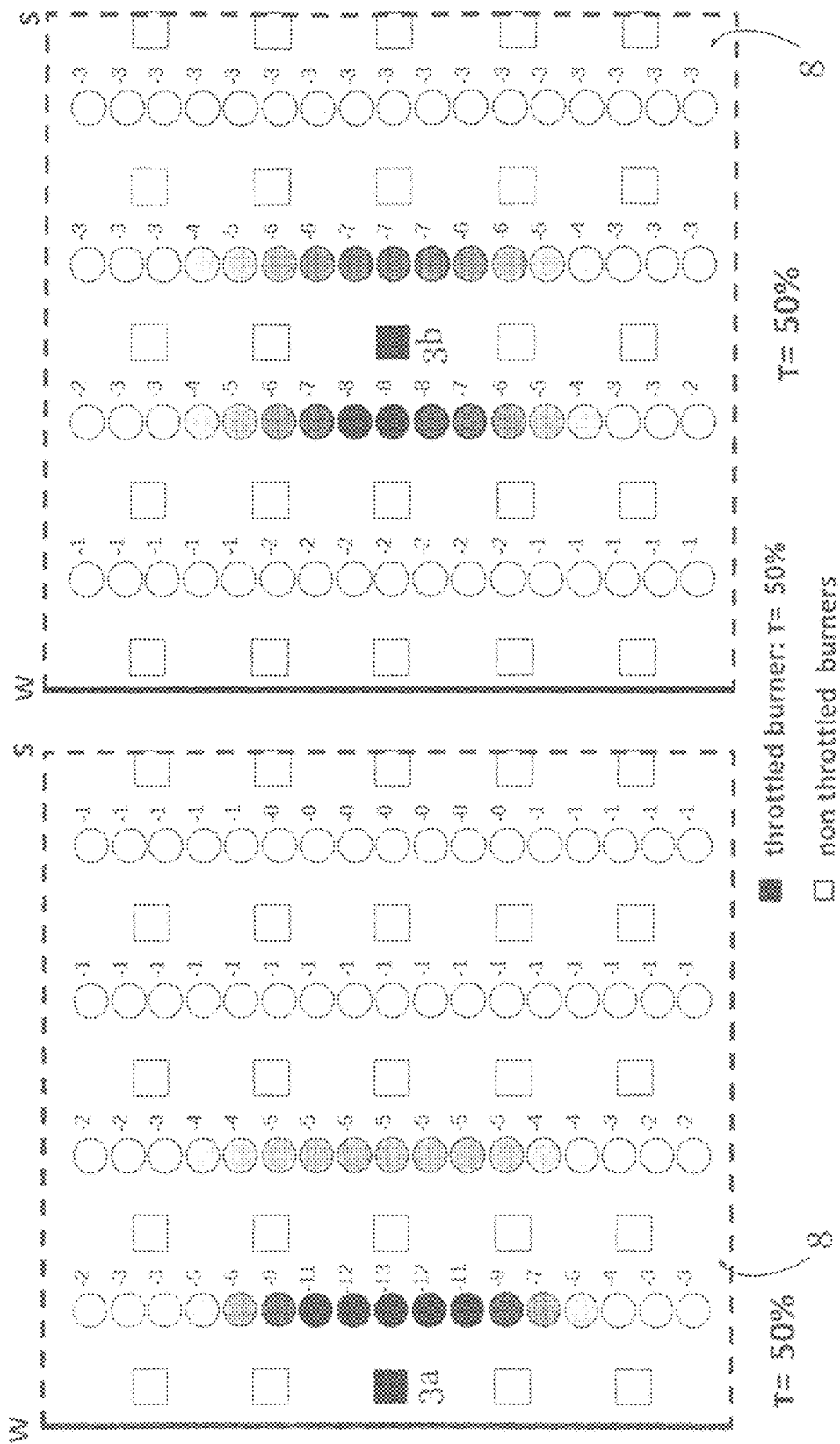
FIG. 4a shows the impact of throttling an outer burner—with a power ratio T of 50%—on the TST of the tubes in a representative domain.
FIG. 4b shows the impact of throttling an inner burner—with a power ratio T of 50%—on the TST of the tubes in the same representative domain.

FIG. 4a illustrates, for a representative domain 8—as defined in FIG. 2—, the impact of throttling an outer burner 3a on the TST of the different tubes. The TST are obtained by using a solver—know per se—which calculates the heat transfer between the combustion chamber of the furnace and the tubes. In the case presented, the burner was throttled so as to obtain a power ratio of 50%.

FIG. 4b shows the impact of throttling an inner burner 3b of the same domain on the TST of the different tubes. The TST are obtained by using the same solver. The power of the throttled inner burner is as well decreased to obtain a power ratio of 50%.

On the two FIGS. 4a and 4b, for each tube in the representative domain, the variation of the TST ($\Delta$TST, also referred to as $\Delta$T on the figures) is presented by referring to the temperatures measured with no throttling, i.e, in standard conditions; $\Delta$TST is varying from "0° C." for tubes not impacted by the throttling to "−13° C." for the most impacted tube. The $\Delta$TST is represented using a grey scale, varying from white to black, from white color for the non-impacted tubes with $\Delta$T=0° C. to black color for the most impacted tube with $\Delta$T=−13° C.

Therefore, FIG. 4a and FIG. 4b illustrate the above mentioned rule of behavior 1 which can be summarized as follows:

throttling a burner will impact the closest two rows of tubes; the effect on tubes of rows further with respect to the throttled burner is negligible; however, it is to be noted that for an outer tube, the two closest rows are on the same side, and for an inner tube, they are one on each side of the throttled burner;

an outer burner throttling has a higher impact on its closest tube row than an inner burner;

within each impacted row, a throttled burner will have the highest impact on the closest tubes; the effect on the tubes decreases rapidly while moving off from the throttled burner, the number of tubes affected by the throttling of a burner is estimated at 4×Ntubes/Nburners—rounded to a whole number—where Ntubes is the number of tubes in the row of tubes and Nburners is the number of burners in the row of burners.

Figures 5A, 5B:
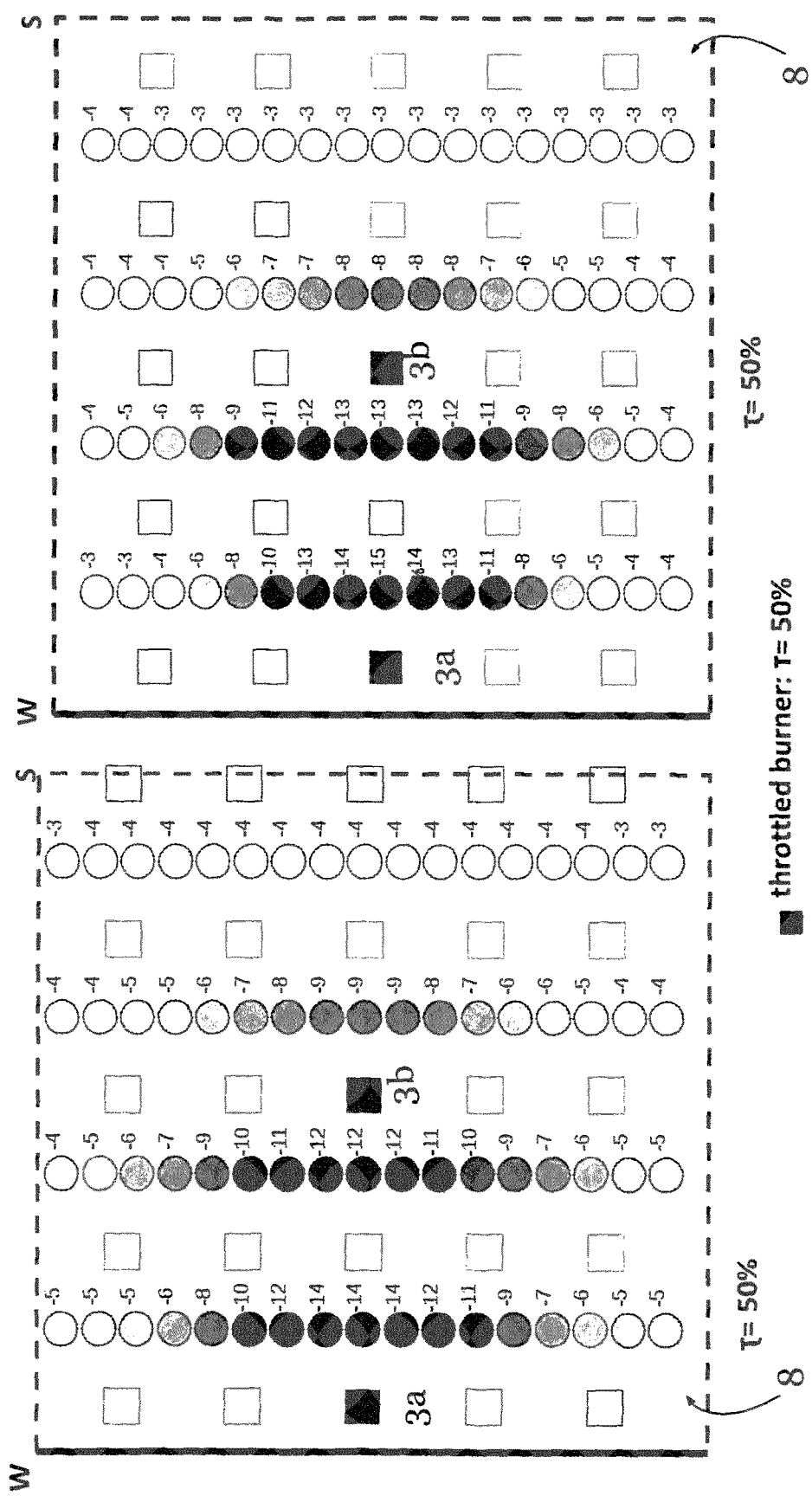
FIG. 5a shows the impact of throttling simultaneously an outer burner and an inner burner on the TST-power ratio τ of 50%—as a result of one simulation with two burners throttled.
FIG. 5b shows the impact of throttling simultaneously an outer burner and an inner burner on the TST-power ratio τ of 50%—resulting from the addition of two individual simulations with one burner.

FIG. 5a shows the impact of throttling simultaneously two burners, more precisely, it shows the result of a single simulation which takes into account the fact that two burners are throttled: an outer burner 3a and an inner burner 3b. For both burners, the burner power was reduced by 50%.

FIG. 5b shows the sum of the two computed effects of the individual throttling of the same burners with the same power ratios.

The comparison of the FIGS. 5a and 5b illustrates the above mentioned rule of behavior 2: the burners that are throttled have a cumulative effect on the tube skin temperature. This means that the impact of a set of throttled burners on a given TST is simply the sum of individual contributions.

Figures 6A, 6B:
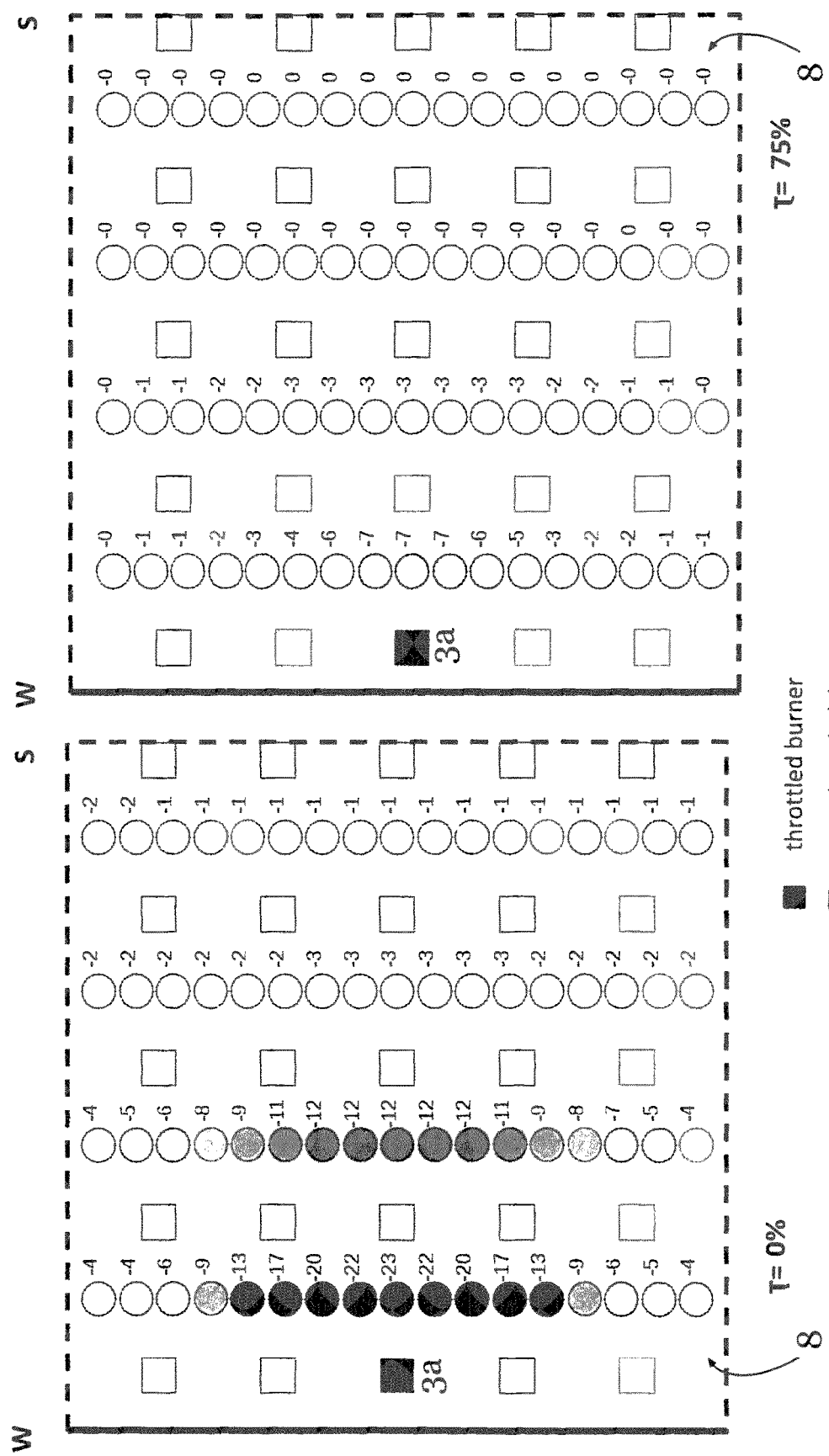
FIG. 6a shows the impact of throttling an outer burner on the TST for a power ratio τ of 0% (closed valve)
FIG. 6b shows the impact of throttling an outer burner on the tubes skin temperature for a power ratio τ of 75% (¾ opened valve)

FIG. 6a and FIG. 6b show the impact of different power ratios for an outer burner 3a on the TST of the most impacted tubes. On FIG. 6a, the power ratio of the burner (black square) is 0% (burner closed). On FIG. 6b, the power ratio of the burner (black square as well) is 75%, meaning that the burner delivers 75% of its nominal power.

The variation of the tubes skin temperatures (referred to as $\Delta$T on the figures) is presented in reference to temperature measured with no throttling, varying from 0° C. for tubes non impacted by the throttling to −23° C. for the most impacted tube The decrease of the TST temperature for each tube is represented using a grey scale, varying from white to black, from a $\Delta$T of 0° C. being of white color to a $\Delta$T of −23° C." being of black color for the most impacted tube on FIG. 6a. The figures illustrate the fact that the tube skin temperature decrease is proportional to the variation of the power ratio. The closest to zero the power ratio is, the more the tube skin temperature TST decreases.

Figure 6C:
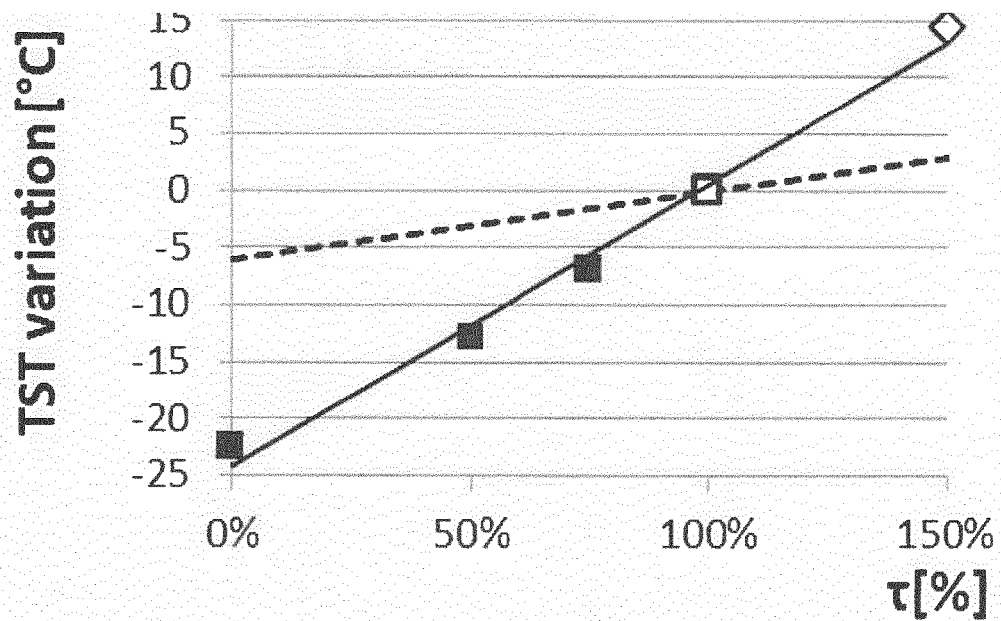
FIG. 6c shows the relation between the TST variation and the power ratio τ.

FIG. 6c shows the variation of TST as a function of $\tau$% for the tube closest to a throttled outer burner using information from FIGS. 4a, 6a and 6b. Black squares ■ represent the three cases for which the power ratio was reduced ($\tau$%=0%, $\tau$%=25% and $\tau$%=75%), while empty square □ represents the case for which the burner power is unchanged ($\tau$%=100%) and "lozenge ◇" is representative of a case for which the burner represented is not throttled while in the meantime a significant number of other burners in the furnace are throttled, thus leading to redistribution of the fuel flow to the non-throttled burners in the furnace and therefore increase of their power, leading to a power ratio of more than 1. The figure evidences the above mentioned rule of behavior 3: the tube skin temperature variation and the power ratio are proportional, as shown by the full line for the tube closest to the throttled burner.

By using the proportionality (rule 3 of the invention)—rule valid in the impacted area around the burner—the variation of the TST of any tube impacted by the throttling can be retrieved as illustrated by the dashed line for a tube further to the throttled burner.

It is because inventors have highlighted these rules that govern the evolution of the TST of the tubes in the SMR furnace in response to burner throttling—i.e. fast decrease of the tube skin temperature with respect to the distance to the throttled burners—linear impact of the power ratio on the tube skin temperature, cumulative effect of throttling several burners—that they have been able to develop the methodology of the invention to determine an optimized map of throttling of burners.

When the method of the invention is utilized for the first time in a steam reformer, or in order to adapt to different operating conditions or to take into account significant changes, the simplified physical model may be calibrated. The calibration step can consist in performing real tube temperature measurements for one or more tubes impacted by a throttled burner, at least for a tube in front of said burner in non-throttled and in throttled conditions; the burner is preferably an outer burner, additional measurement can be performed for the farthest impacted tube impacted by the throttling of the burner, Real TST variation is obtained by comparing the two values in non-throttled and throttled conditions, which will give the slope of the line(s) in FIG. 6c.

The input data of step b) is not limited to the tube skin temperature, it may be also the syngas collector temperature; in this case, the tubes temperature are deduced from the temperature of the corresponding syngas collector temperature. Usually, the deduction considers that the tubes of a row are at the same temperature.

The methodology as proposed uses for calculation the following tools:

an algorithm for optimization,
the simplified physical model according to the invention,
one or several parameters and their associated target to reach that will lead to an improvement of the performance of the process—parameters and related targets are for example: the TST spread and its reduction, and/or the maximum TST and its reduction, and/or the syngas collector temperature spread and its reduction. These parameters are preferred at the present time due to practical reasons: good representation of the behavior of the furnace, input data easy to collect, however, the invention is not limited to this choice of input data and parameters, other parameters and target can be chosen,
one or more power ratio to apply.

EXAMPLES

The solution of the invention has been successfully put into practice on-site at a hydrogen production plant with a top-fired steam methane reformer furnace equipped with 400 tubes organized in 8 rows of 50 tubes each and 135 burners forming 9 rows of 15 burners each.

Thanks to the invention, by applying the methodology taught, it was possible to automatically, and quickly determine advantageous map(s) of burners to throttle with respect to the given target(s).

Firstly, a single set of TST measurements was performed under standard i.e. non-throttled conditions; the measurements were performed with a pyrometer from the first peephole level of the furnace;

The simplified physical model of the invention based on the rules of behavior 1 to 3 above mentioned was used to get a suitable map of burners to throttle, Thanks to its fast computational execution time, the combination of the simplified physical model of the invention and an in-house optimization algorithm, allows to automatically and quickly get from the initial TST measurements obtained in standard conditions—a map of burners to throttle so as to improve the process as expected (i.e. reach the target as required).

The timeliness of achievement of a map of burners to throttle when applying the solution of the invention allows to compare the performances of several maps of burners obtained for different power ratios and/or different parameters and their target.

Figure 7A:
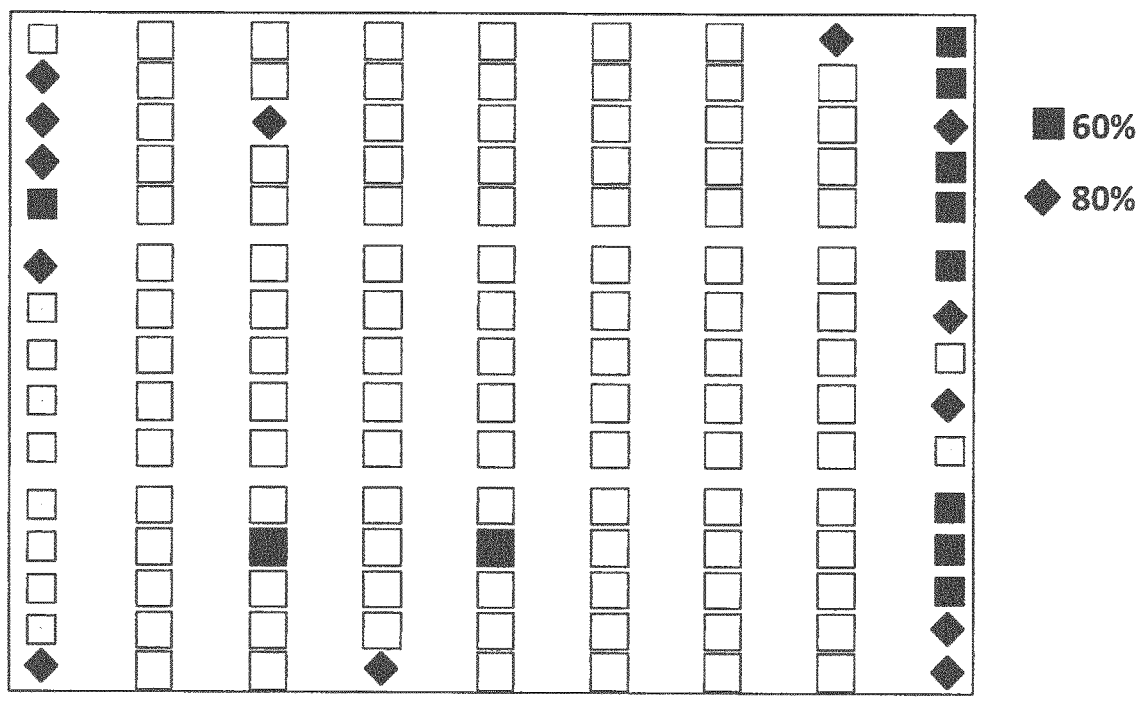
FIG. 7a shows a first example of a map of burners to throttle obtained by the method of the invention for the furnace of FIG. 1, with two power ratios chosen τ% 60% and τ%=80%, and the target parameters being the TST maximum and TST spread.
Figure 8A:
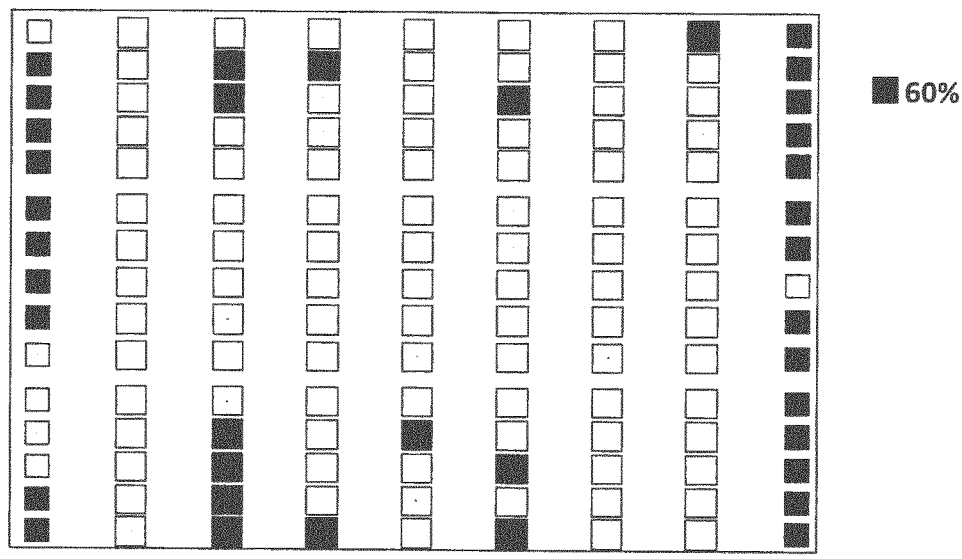
FIG. 8a shows a second example of a map of burners to throttle obtained by the method of the invention for the same furnace with a single power ratio chosen of τ%=60% applied, the target for both parameters TST maximum and syngas collector temperature spread being to reduce them.

Obtaining the maps of burners to throttle presented on FIG. 7a for Example 1 and on FIG. 8a for Example 2 took around 10 minutes, the two experiments were conducted on the same reforming furnace, the standard conditions being identical.

For the implementation of the throttling methodology on site, the reduction of the burner power was obtained by a suitable reduction of the off-gas flow rate, thanks to a valve on the off-gas streams.

Figure 7B:
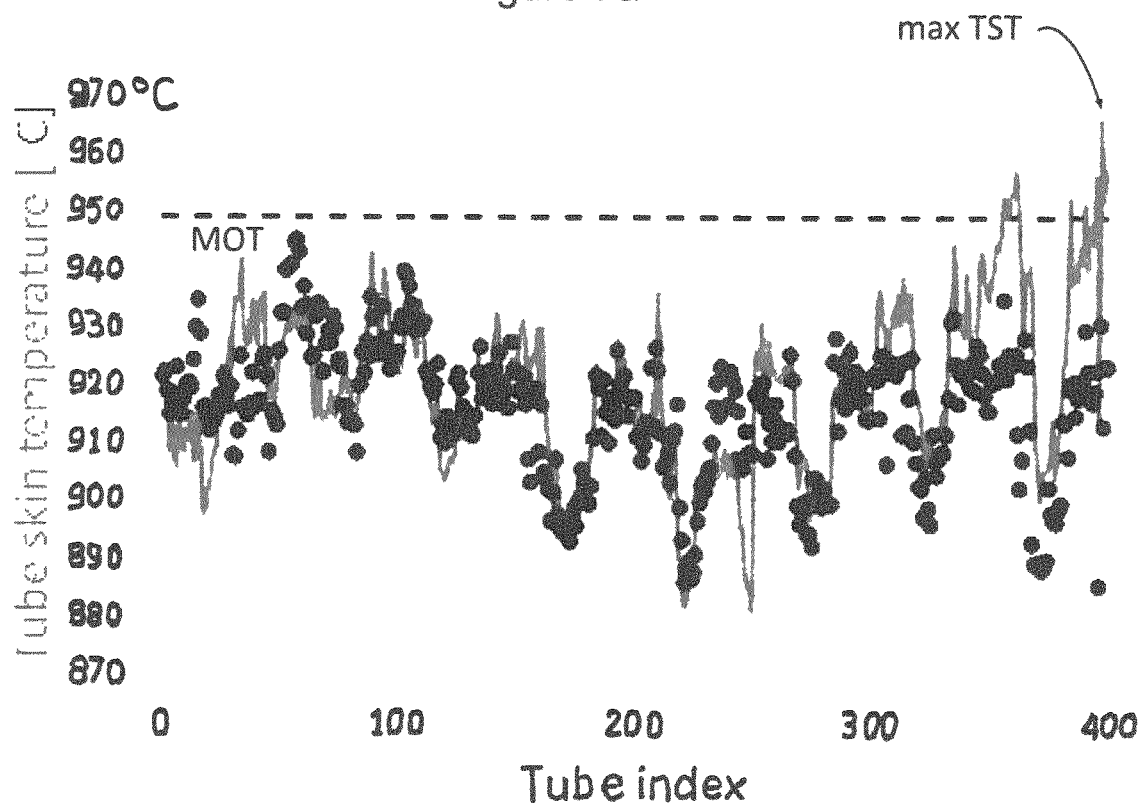
Figure 8B:
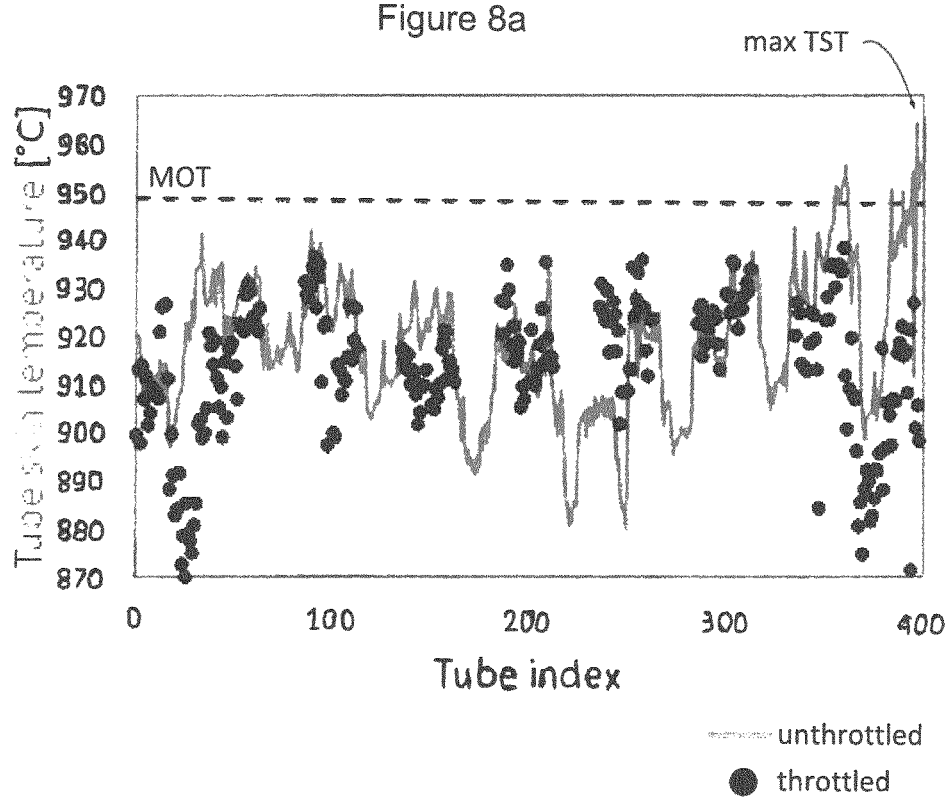

The detailed methodologies applied for the two examples are presented hereafter in relation with FIG. 7a and FIG. 7b for Example 1 and with FIG. 8a and FIG. 8b for Example 2.

Example 1

FIG. 7a shows a map of burners to throttle obtained by the method of the invention. In this first example, two power ratios were chosen: 80% and 60%.

The following target parameters were chosen: decrease of the Maximum TST (i.e. TST of the hottest tube) and decrease of TST spread; an additional target was to minimize the number of burners to be throttled.

On the map of burners to throttle presented on the figure, the burners that have been identified as requiring 80% power ratio are represented as black lozenges "♦", the burners that have been identified as requiring 60% power ratio are represented as black squares "■", the burners with no restriction, i.e. with the fuel flow unchanged (excepted a small redistributed part) are represented as empty squares "☐".

The FIG. 7a shows that to reach the target i.e. decrease the maximum TST and decrease the TST spread while minimizing the number of burners to throttle, 24 burners—individually identified—require to be throttled, 13 burners require to be throttled at 80% power ratio and 11 burners require to be throttled at 60% power ratio.

FIG. 7b shows the TST profiles resulting from the same example: the experimental TST profile measured in the standard operational mode of the burners is represented by the grey line; the TST profile measured after the plant stabilization with all the burners throttled according to the map of FIG. 8a (shown as black circles "●") The MOT (maximum operating temperature) is represented as dashed line.

In standard conditions, as evidenced on the FIG. 7b, some tubes have their TST exceeding the MOT (represented as dashed at 949° C.). They are too hot and this may lead to a tube failure.

Thanks to the implementation of the method of the invention, by throttling the burners according to the map shown on FIG. 7a, all the TST were maintained under the limit of the MOT and in the meantime the TST spread was reduced by 15° C.; this was considered as a sufficiently good solution.

Example 2

FIG. 8a shows another map of burners to throttle obtained by the method of the invention applied to the same furnace. In this example, it was decided to:

apply a single power ratio of 60%, and choosing as target parameters: decrease of maximum TST and reduction of the syngas collector temperature spread. On the figure, the burners that require 60% throttling rate are represented as "black squares ■"; the burners non throttled, i.e. with the fuel flow unchanged (excepted a small redistributed part) are represented as "empty squares □".

The FIG. 8a shows the 37 burners—individually identified—that, when throttled, allow to reach the target.

FIG. 8b shows the TST profiles of the tubes obtained when applying the solution of FIG. 8a: the experimental tube temperature profile measured in the standard operation mode of the burners (as continuous grey line) and the TST temperature profile for the map of burners of FIG. 8a (as "black circles ●"). The MOT (maximum operating temperature) is represented as dashed line.

As evidenced on the FIG. 8b, in standard conditions, the TST of several tubes exceeded the maximum operating temperature.

Figure 9:
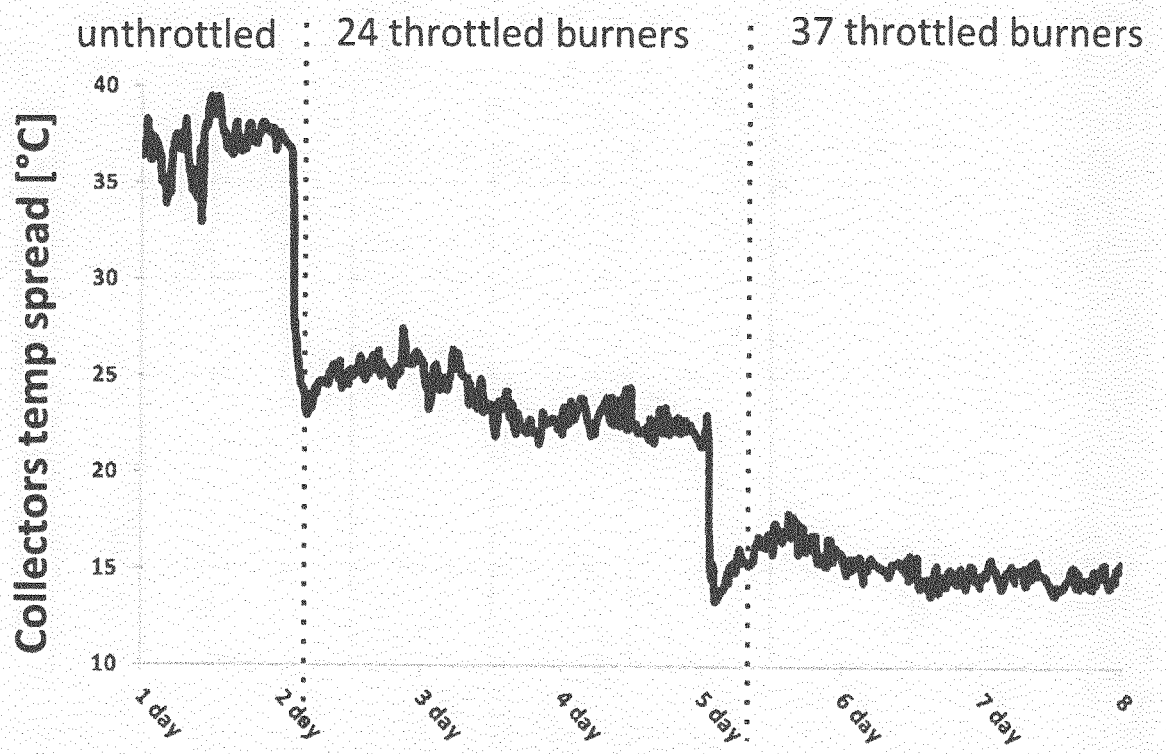

Thanks to the implementation of the method of the invention, it is possible, by throttling the burners according to the map shown in FIG. 8a to maintain the TST of all the tubes under the MOT, in the meantime, the spread of the temperature of the syngas in the collector is decreased (shown on FIG. 9). This was considered for the operation of the plant as a sufficiently good solution.

Finally, FIG. 9 presents the evolution of the measured syngas collector temperature spread when implementing the throttling maps of FIG. 7a and FIG. 8a on site.

by throttling on-site the burners according to the throttling map of FIG. 8a (Example 1 with 24 throttled burners), the syngas collector temperature spread was reduced by 15° C.;

by implementing on-site the throttling map with 37 throttled burners of FIG. 8a (Example 2), the syngas collector temperature spread was reduced by 25° C.

Thanks to the invention, the time required for establishing a map of burners to throttle is of order of ten minutes, which is much shorter than the time required by the previous known solutions; this is due to the fact that the simplified physical model identified and applied by the inventors drastically reduces the duration of the determination of the map of burners to be throttled.

this makes the solution an easy curative method that allows to mitigate the inhomogeneous heat transfer of the heat among the reforming tubes;

burners are easily throttled based on the map of throttled burners; either the operator adjusts manually the burner power according to the map thanks to the valves installed on the pipe or the information is transmitted to a "plant control" and burners are automatically throttled according to the map in a single operation;

it can be used frequently on-site in order for the operators to make decisions in day-to-day work;

it allows to establish several maps of burner to throttle with different power ratio in order to choose the most appropriate solution.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A method of improving an endothermic process in a furnace:
    the furnace containing
        tubes filled with a catalyst for the chemical conversion of a gaseous feed and positioned vertically in rows inside the furnace, and
        burners fed with primary and secondary fuel streams and oxidizer stream and mounted in rows with rows of inner burners placed between two rows of tubes and rows of outer burners placed between a row of tubes and a side wall parallel to the rows of tubes,
    with heat being transferred from the burners to the tubes and with flow rates associated,
    wherein the method improves the homogenization of the temperatures of the tubes by throttling part of the burners,
    the method comprising the steps of:
        step a) calibrating a simplified physical model of step c3) by measuring one or more real tube temperature for at least a tube impacted by the throttling of a burner in standard and in throttled state,
        step b) acquiring information on a real tube temperature for the tubes present in the furnace with all the burners present in the furnace under standard non-throttled conditions,
        step c) getting a map of burners to throttle including:
            c1) choosing at least one parameter representative of the performances of the furnace with a target of improvement,
            c2) choosing at least one or more power ratio for the burner throttling,
            c3) utilizing the information of step b) and the simplified physical model of the impact of throttling a burner on the tube skin temperature for the tubes in the furnace to individually know the impact of the throttling of a burner on the chosen target of step d), and individually identifying burners to throttle, and
            c4) getting a map of burners of the furnace where the burners to throttle are individually identified, and
        step d) throttling the burners according to the map got in step c4),
    wherein the at least one parameter of step c1) is chosen among the following:
    Maximum Tube Skin Temperature, Tube Skin Temperature Spread, Syngas Collector Temperature Spread with the target of improvement being the reduction of the parameter value.

2. The method according to claim 1, wherein the simplified physical model of the impact of burner throttling on the tube skin temperature is based on the following rules of behavior:
    Rule 1) throttling a burner impacts significantly the two closest rows of tubes, said two closest rows of tubes being on the same side for an outer burner and one on each side of the burner for an inner burner; throttling an outer burner has a higher impact on the closest row of tube than on the second row whereas an inner burner throttling distributes the impact on the closest rows of tubes on both sides; within any of the impacted rows, the throttling of a burner has the highest impact on the closest tubes, the impact on the tubes decreasing rapidly while moving off from the throttled burner, the number of tubes impacted by the throttling of a burner is estimated at 4×Ntubes/Nburners, for the impacted tubes the tube skin temperature variation is proportional to the distance from the throttled burner with Ntubes=number of tubes in the row, and Nburners=number of burners in the row;

Rule 2) the impacts of throttled burners on the tube temperature accumulate,

Rule 3) the tube temperatures variations are proportional to the power ratio T with being:

$$T = \frac{P_{non-throttled} + \Delta P}{P_{non-throttled}}$$

where $P_{non-throttled}$ is the power of the burner in standard operational mode and $\Delta P$ is the power variation induced by the throttling with $\Delta P<0$ when the burner power has decreased due to the throttling of the burner and $\Delta P>0$ when the burner power increase due to redistribution of the power among the non-throttled burners in the furnace.

3. The method according to claim 1, wherein in the step c3), the simplified physical model is combined with an optimization algorithm which is either an in house optimization algorithm or algorithms for optimization known in the art.

4. The method according to claim 1, wherein the throttling of the burners is obtained by partially closing at least a valve installed on at least one of the fuel streams or oxidizer stream.

5. The method according to claim 1, wherein the power ratio T % of a throttled burner is between 90% and 50%.

6. The method according to claim 1, wherein the information on a real tube temperature of step b) is the tube skin temperature, being obtained by means of a thermocouple or a pyrometer or an Infrared camera or deduced from the syngas collector temperature being obtained by means of a thermocouple.

7. The method according to claim 1, wherein the method comprises the calibration step a) where real tube temperature measurements are performed for one or more tubes impacted by a throttled burner, at least for a tube in front of said burner in non-throttled and in throttled conditions.

8. A furnace containing reforming tubes being filled with a catalyst for the chemical conversion of a gaseous feed and being positioned vertically in rows inside the furnace, burners being mounted in rows with rows of inner burners placed between two rows of tubes and rows of outer burners placed between a row of tubes and a side wall parallel to the rows of tubes, with heat being transferred from the burners to the tubes and with flow rates associated characterized in that part of the burners are individually throttled according to the map got by the method of claim 1.

* * * * *